United States Patent [19]
Troyer

[11] 3,912,324
[45] Oct. 14, 1975

[54] SWING-OUT TABLE FOR RECREATIONAL VEHICLES

[75] Inventor: Harley D. Troyer, Goshen, Ind.

[73] Assignee: Bangor Punta Operations, Inc., Greenwich, Conn.

[22] Filed: July 2, 1973

[21] Appl. No.: 375,398

[52] U.S. Cl. ................ 296/23 R; 108/44; 108/139; 224/42.44; 312/242; 312/282
[51] Int. Cl.² ............................................ B60P 3/32
[58] Field of Search ............ 296/23 R, 24 A, 37 R; 108/42, 44, 39, 40, 103, 139, 140; 224/42.01, 42.43, 42.44; 312/242, 281, 282

[56] References Cited
UNITED STATES PATENTS

| 1,317,895 | 10/1919 | Rudy | 296/23 R X |
| 1,366,652 | 1/1921 | Harrild | 224/42.01 |
| 1,537,428 | 5/1925 | Fisher | 108/44 X |
| 2,214,575 | 9/1940 | Cercownay | 108/44 X |
| 2,518,242 | 8/1950 | McMahon | 312/329 X |
| 2,772,041 | 11/1956 | Zeabari | 224/42.44 |
| 3,165,368 | 1/1965 | Hughes et al. | 108/42 X |
| 3,712,662 | 1/1973 | Busby | 296/23 R |

FOREIGN PATENTS OR APPLICATIONS

| 1,176,563 | 11/1958 | France | 296/24 A |
| 1,044,571 | 10/1966 | United Kingdom | 296/37 R |

Primary Examiner—Robert J. Spar
Assistant Examiner—Leslie J. Paperner
Attorney, Agent, or Firm—Patrick J. Walsh

[57] ABSTRACT

A swing-out table assembly is disclosed for use with a recreational vehicle. The side wall of the vehicle is provided with an opening with a door pivotable between a horizontal outboard position and a position flush with the side of the vehicle and closing the opening. The table assembly is pivoted to the side wall of the vehicle adjacent an edge of the opening for movement through the opening when the door is opened and between a retracted position inboard of the vehicle and an extended position outboard of the vehicle. The table assembly carries a support leg secured to the underside of the table for pivotal movement about two axes. When the table is swung outboard, the leg is pivoted about a vertical axis and then about a horizontal axis to engage the lower side of the vehicle to assist in the support of the table. Latches are provided to lock the table in both its inboard and outboard positions.

8 Claims, 6 Drawing Figures

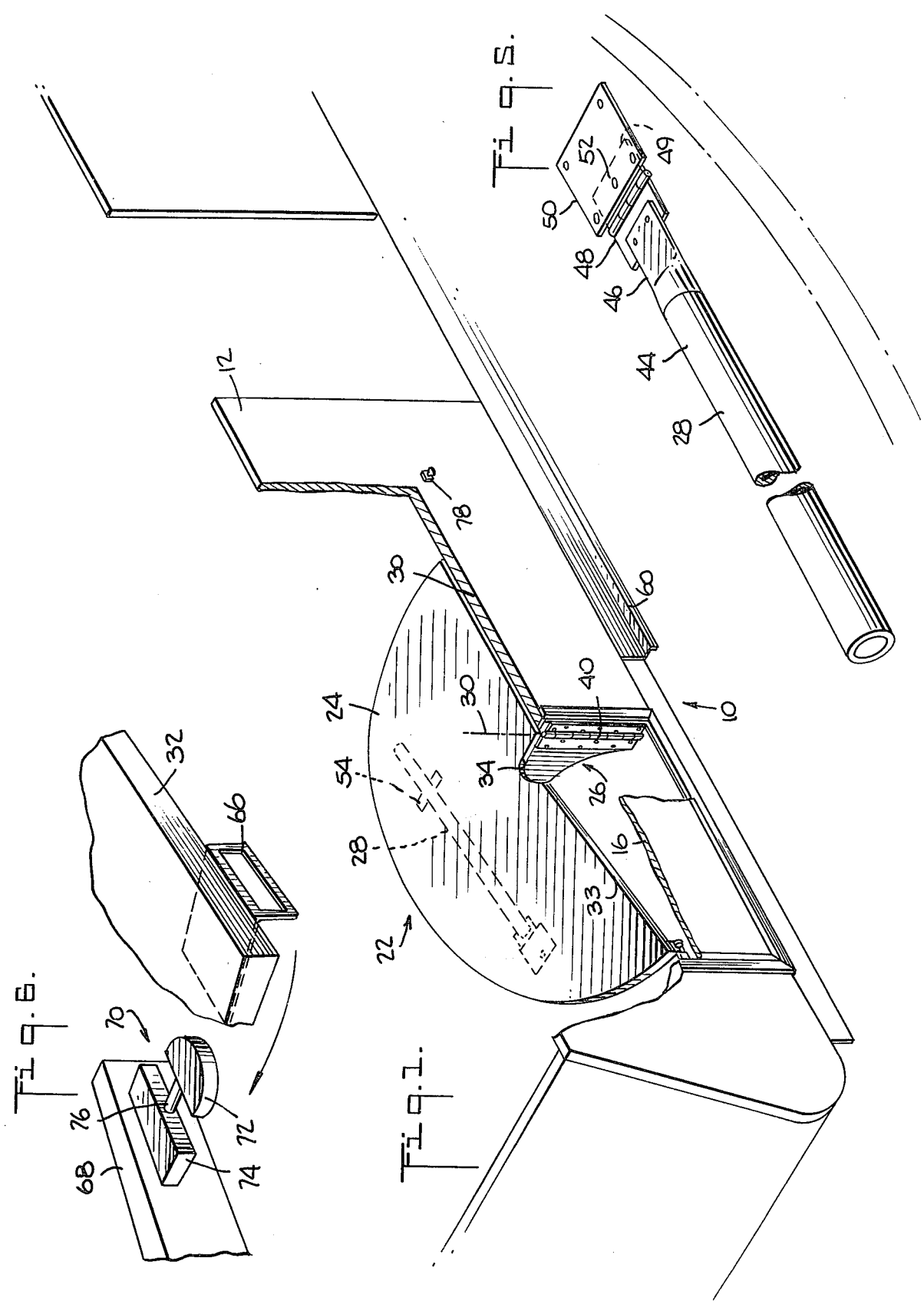

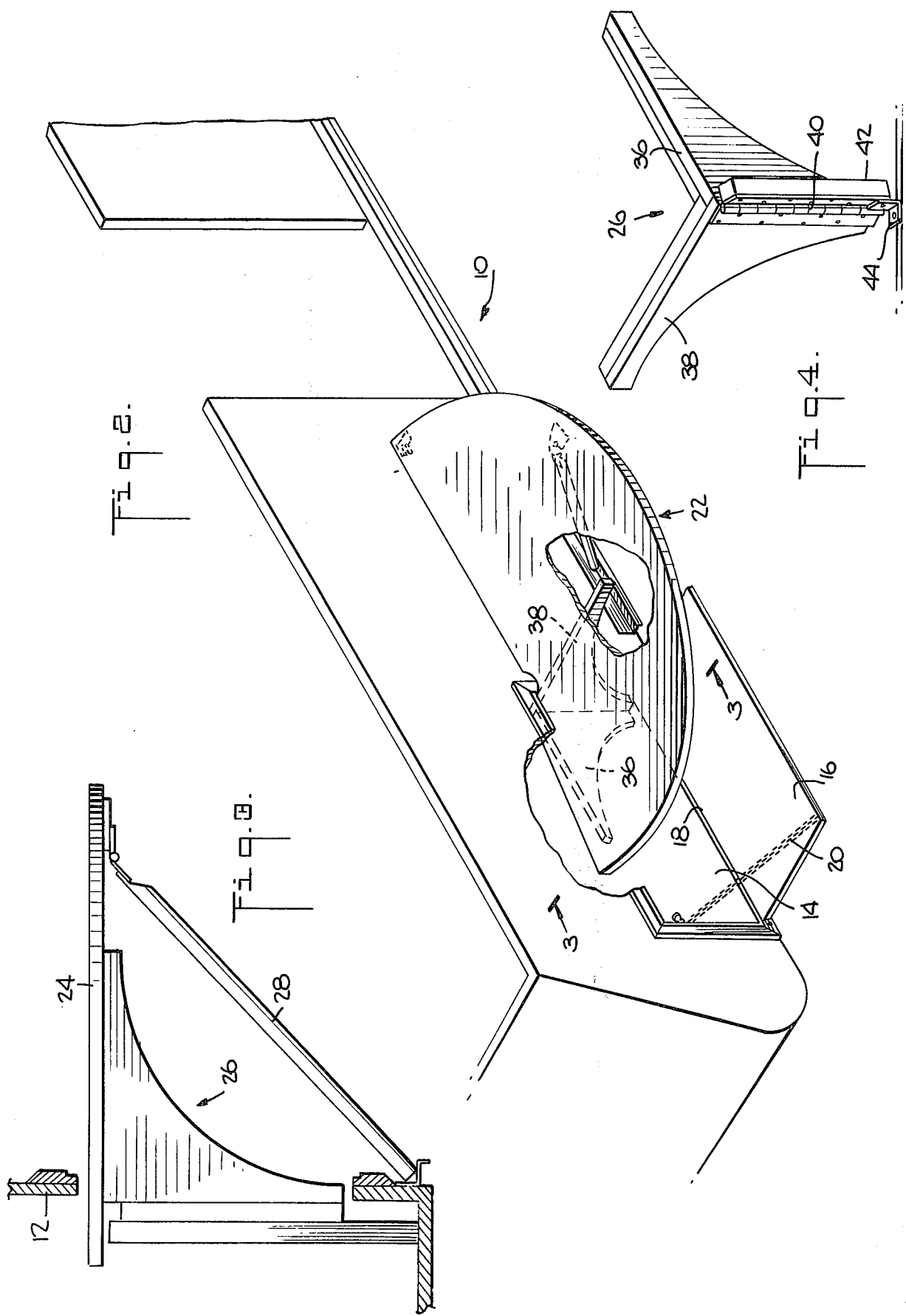

SWING-OUT TABLE FOR RECREATIONAL VEHICLES

The present invention relates to camper arrangements and more particularly to a swing-out table assembly for a recreational vehicle.

Recreational vehicles have come into widespread and frequent use in recent years. As is frequently the case, many items having particular use for camping are stored within the recreational vehicle. When the campsite is reached, each such item, for example a table, is normally unloaded from the vehicle and set up for use independently of the vehicle. Obviously, the unloading and setting up of these items can be a cumbersome, inconvenient, and time-consuming activity particularly when the campers are fatigued which further detracts from their enjoyment in use of the camper. Further, a suitable site for setting up a table may be unavailable due to the nature of the terrain, softness of the ground, etc. Also, these tables must be knocked-down and stored in the recreational vehicle when leaving the campsite. It has, therefore, been found desirable to provide a table assembly which is an integral part of a recreational vehicle and which table can be readily and easily moved from locations within the vehicle, i.e., a stored location, to a location without or outboard of the vehicle, without lifting the table assembly from the vehicle or otherwise extensively handling the table assembly.

The present invention provides a table assembly for a recreational vehicle which minimizes or eliminates the foregoing and other problems associated with the provision of tables in recreational vehicles and provides a novel and improved table assembly for a recreational vehicle having various advantages in construction, mode of use and result in comparison with prior camper carried table facilities. Particularly, the present invention provides in a recreational vehicle having a side wall, an opening normally closed by a door mounted on a horizontal axis for swinging movement to an open, generally horizontal, position outboard of the vehicle. The table assembly includes a generally semi-circular table top hinged about a vertical axis at substantially the center of the diametrically extending edge thereof to the side wall of the vehicle adjacent one side of the opening therethrough. The hinge assembly includes a pair of swivel supports which underlie and support the table. The table is thus pivotal from a position on the inboard side of the wall of the vehicle with its diametrically extending edge lying closely adjacent to the inboard side wall through the opening to a location outboard of the side wall of the vehicle with the diametrically extending edge of the table lying adjacent to and substantially parallel to the side wall of the vehicle. That is, the table assembly can be pivoted through 180° between its retracted inboard and extended outboard positions.

A significant feature of the present invention resides in the mounting of a table supporting leg along the underside of the table. It will be appreciated that it is desirable to provide additional support for the table when swung to its outboard position and also that such support be provided by the vehicle rather than the ground. Further, it is necessary to provide such support in a manner which does not interfere with the swinging movement of the table assembly between its inboard and outboard positions. To accomplish the foregoing, the present invention provides a table support leg which is pivotally connected to the underside of the table adjacent the arcuate margin thereof. The securement includes a hinged mounting providing for pivotal movement of the table support leg about an axis normal to the table and also about an axis generally parallel to the table. Thus, when the table assembly lies in its inboard position, the table leg is secured by a strap or the like to the underside of the table with the leg extending generally parallel to the diametrically extending edge of the semicircular table top. After the table is swung to the outboard position and the support leg is clear of the opening, the support leg is released for downward swinging movement about a horizontal axis and lateral swinging movement about its vertical axis such that the lower end of the support leg is engageable with a support or shoulder provided on the side wall of the vehicle. In this manner the support let inclines upwardly and outwardly from the lower edge of the side wall of the vehicle and provides support for the cantilevered table when in its outboard position. The support leg is also readily disengaged from the side of the vehicle and pivoted back to its position underlying the table top, thereby permitting the table top and the support leg carried thereby to be swung through the side wall opening to its inboard position.

A further feature hereof resides in a latch assembly for locking the table assembly in either its inboard or outboard position. To accomplish this, a latch is provided at one corner of the table. When in the inboard position, the latch engages a keeper carried by the vehicle side wall remote from the table hinge whereby the table top is locked in its inboard position. In the outboard position of the table top, the latch at the table corner engages a keeper carried by the vehicle side wall on its outboard side and on the other side of the table hinge assembly from the first mentioned keeper. Thus, the table assembly is locked in the outboard position. Moreover, this latching assembly provides additional support for the table in each of its inboard and outboard positions. Additionally, the door which closes the opening through which the table top is swung, provides a shelf when horizontally disposed.

Accordingly, it is a primary object of the present invention to provide a novel and improved table assembly for a recreational vehicle.

It is another object of the present invention to provide a novel and improved table assembly for a recreational vehicle wherein the table is readily and easily located in either an inboard or an outboard position relative to the vehicle.

It is still another object of the present invention to provide a novel and improved table assembly for recreational vehicles which is mounted on the vehicle for swinging movement between locations respectively inboard and outboard of the vehicle.

It is a further object of the present invention to provide a novel and improved table assembly for recreational vehicles which table assembly forms an integral part of the vehicle structure.

It is a still further object of the present invention to provide a novel and improved table assembly for recreational vehicles wherein the table assembly is fully and solely supported by the vehicle when in either of its inboard of outboard positions. It is a related object hereof to provide a table support assembly having a table support leg movable between stored and supporting positions for the table and supporting the table assembly in its outboard position directly from the vehicle.

It is a still further object of the present invention to provide a swing out table assembly for use with a recreational vehicle wherein the table assembly occupies minimum space within the vehicle.

These and further objects and advantages of the present invention will become more apparent upon reference to the following specification, appended claims and drawings wherein:

FIG. 1 is a fragmentary perspective view of a table assembly for recreational vehicles constructed in accordance with the present invention and illustrated with parts broken out and in cross section and with the table assembly in an inboard position;

FIG. 2 is a view similar to FIG. 1 illustrating the table assembly swung out into a location outboard of the recreational vehicle;

FIG. 3 is an enlarged cross-sectional view thereof taken generally about on line 3—3 in FIG. 2;

FIG. 4 is a perspective view of the swivel support for the table assembly;

FIG. 5 is a perspective view of the table support leg and illustrated in a stored position along the underside of the table top; and FIG. 6 is an enlarged fragmentary perspective view illustrating the latching assembly for locking the table in the inboard position.

Referring now to the drawings, particularly to FIG. 1, there is illustrated a portion of a recreational vehicle or camper trailer generally designated 10. Particularly, the side wall 12 of the vehicle 10 is illustrated, it being appreciated that the area behind wall 12 lies on the inboard side of the vehicle while the area in front of wall 12 is outboard of the vehicle. The side wall 12 of vehicle 10 is provided with a generally rectangular opening 14 which is normally closed by a door 16 hinged for pivotal movement about a generally horizontal axis at 18. A suitable latch, not shown, is provided for releasably locking the door 16 in a closed position substantially parallel with the side wall 12. A pair of support chains 20 interconnect outboard portions of door 16 with the side wall frame 12 to suspend the door 16 in a generally horizontal position thereby enabling the table assembly, generally designated 22, to be moved between inboard and outboard positions.

Table assembly 22 includes a table top 24, a swivel support generally designated 26, and a table support leg 28 secured along the underside of the table top 24 in a manner described hereinafter. The table top 24 is substantially semicircular in plan view with one edge 30 thereof extending substantially along a radius having the pivotal axis 32 substantially at its center. The other edge 33 of the table top 24 extends from the peripheral margin of the table along a line, which is slightly offset of a radius to the axis 32, terminating at its inner end in a cutout 34. The edges 30 and 33 of table 24 may be described, however, as generally lying along a diameter of table top 24. As will be appreciated from the ensuing description, the cutout 34 is necessary to permit table top 24 to swing about axis 32 from the inboard position illustrated in FIG. 1 to the outboard position illustrated in FIG. 2.

As best illustrated in FIGS. 3 and 4, the swivel support 26 for table assembly 22 includes a pair of support braces 36 and 38 secured one to the other in right angular relation. The upper surfaces of each brace 36 and 38 are secured to the table top 24 along its underside with the brace 36 extending along table top 24 adjacent edge 30. A piano type hinge 40 is provided along the juncture of braces 36 and 38 with one leaf of the hinge secured thereto while the other leaf is secured to a bracket 42 in turn secured to the side wall 12. The securement of bracket 42 to the vehicle is reinforced at the bottom by an angle bracket 44. It will be appreciated that bracket 42 forms one side of the opening 14 through the side wall 12 of the vehicle. Thus, and as illustrated, swivel support 26 enables the table assembly 22 to swing from its inboard position as illustrated in FIG. 1 to its outboard position as illustrated in FIG. 2. The table top 24 is, of course, supported in both positions by the braces 36 and 38 as well as additional supports as hereinafter amplified.

To provide support for the table top 24 when in the outboard position and from the vehicle 10, a significant aspect of the present invention includes the provision of support leg 28. Support leg 28 is pivotally secured to table top 24 for movement between stored and supporting positions. Particularly, and referring to FIG. 5, support leg 28 includes a tubular section 44 flattened at its upper end at 46 for securement to one leaf of a piano type hinge 48. The other leaf 49 of hinge 48 is, in turn, pivotally secured, preferably by pinning, to plate 50 which in turn is suitably secured to the underside of a table top 24 by screws and the like. It will thus be appreciated that the support leg 28 is thus hingedly connected to the underside of table top 24 for pivotal movement about an axis generally horizontal to the table, i.e., by hinge 48 and about an axis normal to the table top 24 and hinge 48 as defined by pin 52. A suitable strap 54 (FIG. 1) is also secured to the underside of the table and adapted to releasably secure support leg 28 along the underside of table top 24 in a stored position. When the table assembly is moved to the outboard position illustrated in FIG. 2, it will be appreciated that the leg 28, after strap 54 is released, is swung downwardly about hinge axis 48 and then rotated about the axis of pin 52 such that the lower end of leg 28 is engageable against an angle 60 secured along the lower outer side of vehicle 10. Thus additional support for the table is provided by the leg 28. This particular two axis hinge is significant in the present invention since in order to form a support for the table from the vehicle, the length of support leg 28 must necessarily be longer than the distance between the pivot 52 and the flat edges of the table or the side 12 when the table is swung in the outboard position. Consequently, in order to provide a greater length of leg 28 and also to permit it to pass with the table assembly through the side wall opening, the two axes pivotal mounting is provided. It will be appreciated that leg 28 lies substantially parallel to the edges 30 and 32 when in the stored position whereby it can be stored within the vertical confines of the table yet can be pivoted and swung inwardly when the table obtains an outboard position to provide support for the table directly from the vehicle. Alternatively, a universal joint such as a ball joint could be utilized to secure leg 28 to table 24.

The table top 24 is also locked in each of its inboard and outboard positions by a latching assembly. Particularly, the end of edge 32 adjacent the periphery of table 24 is provided with a downwardly extending laterally opening catch 66 (FIG. 6). Secured on a suitable support member 68 forming a part of side wall 12 is a keeper 70 having a rotatable head 72 spaced from base portion 74 thereof and carried by a rod or shaft 76. Also mounted on the outer side of wall 12 is a similar keeper 78. When table assembly 22 lies in its inboard position as illustrated in FIG. 1, head 72 is received through catch 66 and rotated whereby table 24 is secured from rotation and also, in part, supported by keeper 70. Upon rotation of head 72 into alignment with the slot in bracket 66, table assembly 22 can be rotated to the outboard position illustrated in FIG. 2 with the slotted portion of bracket 66 again receiving the head of keeper 78. Thus, the extreme edge of the table is secured in the outboard position with keeper 78 also providing partial support therefor.

In use, and assuming the table assembly lies in the inboard position illustrated in FIG. 1, the door 16 is first unlatched and swung out to a horizontal position as illustrated in FIG. 2. The head of keeper 70 may then be rotated to release table assembly 22 from its locked inboard position for rotation to the outboard position as illustrated in FIG. 2. Keeper 78 and bracket 66 secures the table in the outboard position. Leg 28 is then swung downwardly about axis 48 and rotated or turned about pivot 52 such that the lower end of leg 28 engages angle 60. Thus, the table is fully supported at four different positions as it lies outboard of the recreational vehicle. To retract the table from its outboard position to its inboard position, the foregoing noted steps are reversed. That is, keeper 78 is unlocked and leg 28 is first pivoted laterally and then swung upwardly for securement to table 24 by strap 54. The table is then swung about hinge axis 32 to the inboard position and locked in place by keeper 70. Door 16 is then pivoted upwardly to its closed position as illustrated in FIG. 1 and latched.

It will be appreciated that the foregoing described table assembly for recreational vehicles fully accomplishes the intended objects and purposes of this invention in that the table assembly 22 is readily movable between inboard and outboard positions relative to the side wall of the recreational vehicle. Moreover, this is accomplished without any lifting or other awkward handling of the table assembly. Furthermore, the table assembly is fully supported in the outboard position by support leg 28 and directly from the vehicle per se whereby the table will always remain in a level position relative to the camper, thus eliminating the problems of uneveness or unsuitability of the ground below the camper. Furthermore, the foregoing is provided in a relatively simple and economic construction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a recreational vehicle having a side wall with an opening therethrough, a table assembly including a table, means for pivotally mounting the table to the vehicle for movement through the side wall opening between first and second locations on respective opposite sides of the side wall, a table leg carried for pivotal movement about two axes respectively generally parallel and normal to the table along its underside for movement between a stored position and a table supporting position, and means carried by the side wall of said vehicle for engaging and supporting the table leg in its table supporting position.

2. A table assembly according to claim 1 wherein said table is generally semicircular in configuration, said table being pivotally secured substantially at its center and along its diameter to the side wall of said vehicle adjacent a side edge of said opening.

3. A table assembly according to claim 2 wherein said table has a diameter about twice the width of the opening, said table in each of said first and second locations thereof having a pair of edge portions lying in lateral registry with said side wall and said opening respectively.

4. A table assembly according to claim 1 including means for locking said table from movement in each of said first and second table locations.

5. A table assembly according to claim 4 including a latching element carried by said table and a pair of parts cooperable with said latching elements for locking the table on respective opposite sides of said side wall, one of said locking parts being cooperable with said latching elements to lock the table in said first location on one side of said side wall, the other of said locking parts being cooperable with said latching elements to lock the table in said second location on the other side of said side wall.

6. A table assembly according to claim 1 including a door for said opening, means pivotally mounting said door to said vehicle for swinging movement between a position closing said opening and a position spaced from said opening.

7. In a recreational vehicle having a side wall with an opening therethrough, a table assembly including a table, means for pivotally mounting said table to said vehicle for swinging movement through the side wall opening between first and second locations on respective opposite sides of said side wall, a table leg pivotally carried by said table along its underside for movement between a stored position and a table supporting position for supporting said table in a generally horizontal position in at least one of the first and second locations of said table, said table leg being carried for pivotal movement about two axes respectively generally parallel and normal to said table, said table leg axes being respectively substantially normal and parallel to the pivotal axis for said table, said leg in said stored position lying generally parallel to said table and being pivotal about said parallel axis for swinging movement from said stored position downwardly from the table, and a support for said table leg carried by said vehicle along one side thereof, said leg being pivotal about said normal axis for engaging its lower end with said leg support whereby said table is supported from said vehicle by said leg in one of said first and second table locations.

8. In a recreational vehicle having a side wall with an opening therethrough, a table assembly including a table, means carried by said vehicle for pivotally mounting said table to said vehicle for swinging movement through the side wall opening between first and second locations on respective opposite sides of said side wall, said table being generally semicircular in configuration, said table being pivotally secured substantially at its center and along its diameter to the side wall of said vehicle adjacent a side edge of said opening, said table having a diameter about twice the width of the opening, said table in each of said first and second locations thereof having a pair of edge portions lying in lateral registry with said side wall and said opening respectively, and means for supporting said table in a generally horizontal position in at least one of the first and second locations of said table, said support means including a table leg pivotally carried by said table along its underside for movement between a stored position and a table supporting position, said table leg being carried for pivotal movement about two axes respectively generally parallel and normal to said table, said table leg axes being respectively substantially normal and parallel to the pivotal axis for said table, said leg in said stored position lying generally parallel to said table and being pivotal about said parallel axis for swinging movement from said stored position downwardly from the table, a support for said table leg carried by said vehicle along one side thereof, said leg being pivotal about said normal axis for engaging its lower end with said leg support whereby said table is supported from said vehicle by said leg in one of said first and second table locations, means for locking said table from movement in each of said first and second table locations, said table assembly including a latching element carried by said table and a pair of parts cooperable with said latching elements for locking the table on respective opposite sides of said side wall, one of said locking parts being cooperable with said latching elements to lock the table in said first location on one side of said side wall, the other of said locking parts being cooperable with said latching elements to lock the table in said second location on the other side of said side wall.

* * * * *